(12) United States Patent
Livens et al.

(10) Patent No.: US 7,262,881 B2
(45) Date of Patent: Aug. 28, 2007

(54) METHOD TO DETERMINE A CHARACTERISTIC OF A PRINTING SYSTEM

(75) Inventors: Stefan Livens, Wijnegem (BE); Rudolf Bartels, Boortmeerbeek (BE)

(73) Assignee: Agfa Graphics NV, Mortsel (BE)

( * ) Notice: Subject to any disclaimer, the term of this patent is extended or adjusted under 35 U.S.C. 154(b) by 1085 days.

(21) Appl. No.: 10/271,404

(22) Filed: Oct. 15, 2002

(65) Prior Publication Data

US 2003/0072473 A1    Apr. 17, 2003

Related U.S. Application Data

(60) Provisional application No. 60/338,915, filed on Dec. 10, 2001, provisional application No. 60/373,712, filed on Apr. 18, 2002.

(30) Foreign Application Priority Data

Oct. 15, 2001  (EP) .................................. 01203903
Jan. 18, 2002  (EP) .................................. 02100041

(51) Int. Cl.
*G06K 15/00*  (2006.01)
*H04N 1/46*   (2006.01)

(52) U.S. Cl. ........................................ 358/1.9; 358/504
(58) Field of Classification Search ................ 358/1.1, 358/1.9, 3.01, 3.1, 3.23, 1.14, 502, 504, 522, 358/520; 382/112, 165
See application file for complete search history.

(56) References Cited

U.S. PATENT DOCUMENTS

| 6,230,622 | B1  |   | 5/2001 | Dilling |
| 6,233,061 | B1  |   | 5/2001 | Huang et al. |
| 6,371,609 | B1  | * | 4/2002 | Oikawa ........................ 347/96 |
| 6,386,670 | B1  | * | 5/2002 | Huang et al. .................. 347/15 |
| 7,050,196 | B1  | * | 5/2006 | Piatt et al. .................... 358/1.9 |

FOREIGN PATENT DOCUMENTS

| JP | 02003327  | 1/1990 |
| JP | 2001270139 | 10/2001 |

\* cited by examiner

*Primary Examiner*—Gabriel Garcia
(74) *Attorney, Agent, or Firm*—Robert A. Sabourin

(57) ABSTRACT

A method and a system for determining a characteristic of a printing system, the printing system including a printing device and a receiving substrate. Data from a pattern printed on the receiving substrate by the printing device are analyzed. Based on the analysis, an artifact characteristic of the printing system is determined automatically.

14 Claims, 2 Drawing Sheets

METHOD TO DETERMINE A CHARACTERISTIC OF A PRINTING SYSTEM

The application claims the benefit of U.S. Provisional Application No. 60/338,915 filed Dec. 10, 2001, U.S. Provisional Application No. 60/373,712 filed Apr. 18, 2002, EP application (DE) No. 01203903.8 filed Oct. 15, 2001 and EP application (DE) No. 02100041.9 filed Jan. 18, 2002.

FIELD OF THE INVENTION

The present invention relates to the field of image rendering by means of output devices, particularly multicolor proofing devices and more particularly multicolor ink-jet proofing devices; the invention especially concerns calibration of these devices, particularly ink limitation.

BACKGROUND OF THE INVENTION

A "colorant" means in this document an independent variable with which an output device can be addressed. A "colorant value", denoted as c, is an independent value that can be used to control a colorant of the output device. The colorants of an offset printing press, for example, are the offset printing inks. It is customary to express the range of physically achievable values for the colorants of a device in %, which means that usually the colorant values range from c=0% to c=100%. In graphic arts, colorant values are often called dot percentages. An output device or printing device with n colorants, wherein $n \geq 1$, will also be called below a "printer" or an "n-ink process". The output device may be a proofing device with a cyan (C), a magenta (M), a yellow (Y) and a black (K) colorant.

To put a color output device in a standard state, a calibration procedure is applied. In fact, an output device can drift away from its standard state; e.g. changes in room humidity or use of a fresh supply of ink may cause a printer to produce different color. The objective of device calibration, therefore, is to bring a device back to a known, standard state, so that it produces predictable color every time it receives the same input colorant values. To calibrate a printer, typically a calibration target is printed by the printer and measured. If the measurements indicate that the printer has drifted away from its standard state, calibration curves are calculated from the measurement results to correct for this drift. A calibration curve transforms a colorant value to another colorant value. We refer to patent application EP 1 083 739 for more information on calibration, color gamut and other relevant terms.

For some color output devices it is advantageous to apply ink limitation in the calibration step. In this way it is possible to reduce the influence of visually disturbing artifacts, that may occur if too much ink is laid down on the receiving substrate. For ink-jet printers for example, the ink can bleed significantly, especially if the receiving substrate upon which the ink is deposited is some low quality paper such as newsprint, i.e. paper used for newspapers. Bleeding normally gets more important with increasing colorant values, i.e. with increasing ink amounts. Other special effects such as coalescence may also be reduced or avoided by limiting the ink amount. All these visually disturbing effects are referred to in this document as "artifacts". On the other hand, for some printers there is no or no significant gamut increase beyond specific colorant values (the gamut is the delimited region in color space of the colors that are physically realizable by a given printer). Further, reducing the amount of ink decreases the drying time of the receiving substrate. Because of all these factors, applying ink limitation is important.

U.S. Pat. No. 6,371,609 to Oikawa teaches an inkjet recording apparatus that deals with the problem of ink spread. A solution that is disclosed in this patent is to eject a liquid in a separate row of nozzles that reacts with ink that has been ejected by another row of nozzles in the same print head.

U.S. Pat. No. 7,050,196 to Piatt et al. specifically deals with limiting the maximum amount of a colorant. According to this patent a maximum amount of colorant is determined by means of a test pattern that includes specific patterns for measuring bleed between colors, reverse text fill, paper cockle and ink showing through the back side of a paper.

A problem is that, up to now, artifacts are evaluated manually on printouts. This can be very time-consuming if the evaluation has to be repeated for many different ink limitation settings. Therefore, an improved method is needed.

SUMMARY OF THE INVENTION

The present invention is a method as claimed in independent claims 1 and 8, and a corresponding system as claimed in independent claim 13. Preferred embodiments of the invention are set out in the dependent claims. Preferably, a method in accordance with the invention is implemented in a computer program product as claimed in independent claim 20.

The invention involves analyzing data from a pattern printed on a receiving substrate by a printing device. Based on the analysis, an artifact characteristic of the printing device/receiving substrate combination, such as a bleeding characteristic, is automatically determined. In this document, an "artifact characteristic" means a characteristic that indicates if one or more types of artifacts, such as e.g. bleeding, are present, and possibly to what extent, for a specific printing mode (i.e. printing settings such as type of printer, type of receiving substrate, resolution, ink) and ink amounts. The printing device is preferably a proofing device, used e.g. for a newspaper proofing application.

An advantage of the invention is that the artifact characteristic is determined automatically, which is much less time-consuming than manual determination.

In a first embodiment of the invention, an ink amount of the printing device is selected and one or more artifact characteristics corresponding to the selected ink amount are automatically determined. Preferably, the ink amount is selected by a user and the corresponding artifact characteristic(s) are shown to the user, e.g. on a computer display, by a software application. A reduction of the ink amount usually decreases the artifacts but also reduces the color gamut, which is preferably as large as possible. Therefore, it is preferred that the color gamut corresponding to the selected ink amount is also determined. Preferably, both the artifact characteristic(s) and the gamut are shown to the user so that he can either accept or reject the selected ink amount. In a preferred embodiment, the user can interactively change the ink amounts of the printing device and automatically see the effect on the artifact characteristics on the one hand and on the gamut on the other hand. An advantage of the invention is that it allows a user to choose optimal ink limitation values while taking into account the effect of the limitation on both artifacts and gamut.

In a second embodiment of the invention, an ink limitation is not determined interactively but it is determined automatically, based on the analysis of the data from the printed pattern. The ink limitation may be determined by taking into account the artifact characteristics that correspond to different values of the ink amount that is to be limited. The corresponding gamut may also be taken into account.

Another embodiment of the invention is a system comprising a printing device, analyzing means and determining means. A pattern is printed on a receiving substrate by the printing device and data from the pattern are analyzed by the analyzing means. The analyzing means may be a measurement device such as an X-Rite DTP41 spectrophotometer. Based on the analysis, an artifact characteristic of the printing device/receiving substrate combination is determined automatically by the determining means. The determining means may be implemented by a computer and a computer program for the computer. In a specific embodiment, the analyzing means is incorporated in the printing device.

Preferred embodiments of a system in accordance with the invention may include features of a method—as claimed or as described above or below—in accordance with the invention.

Further advantages and embodiments of the present invention will become apparent from the following description and drawings.

BRIEF DESCRIPTION OF THE DRAWINGS

The invention is described with reference to the following drawings without the intention to limit the invention thereto, and in which.

DETAILED DESCRIPTION OF THE INVENTION

Figure 1:
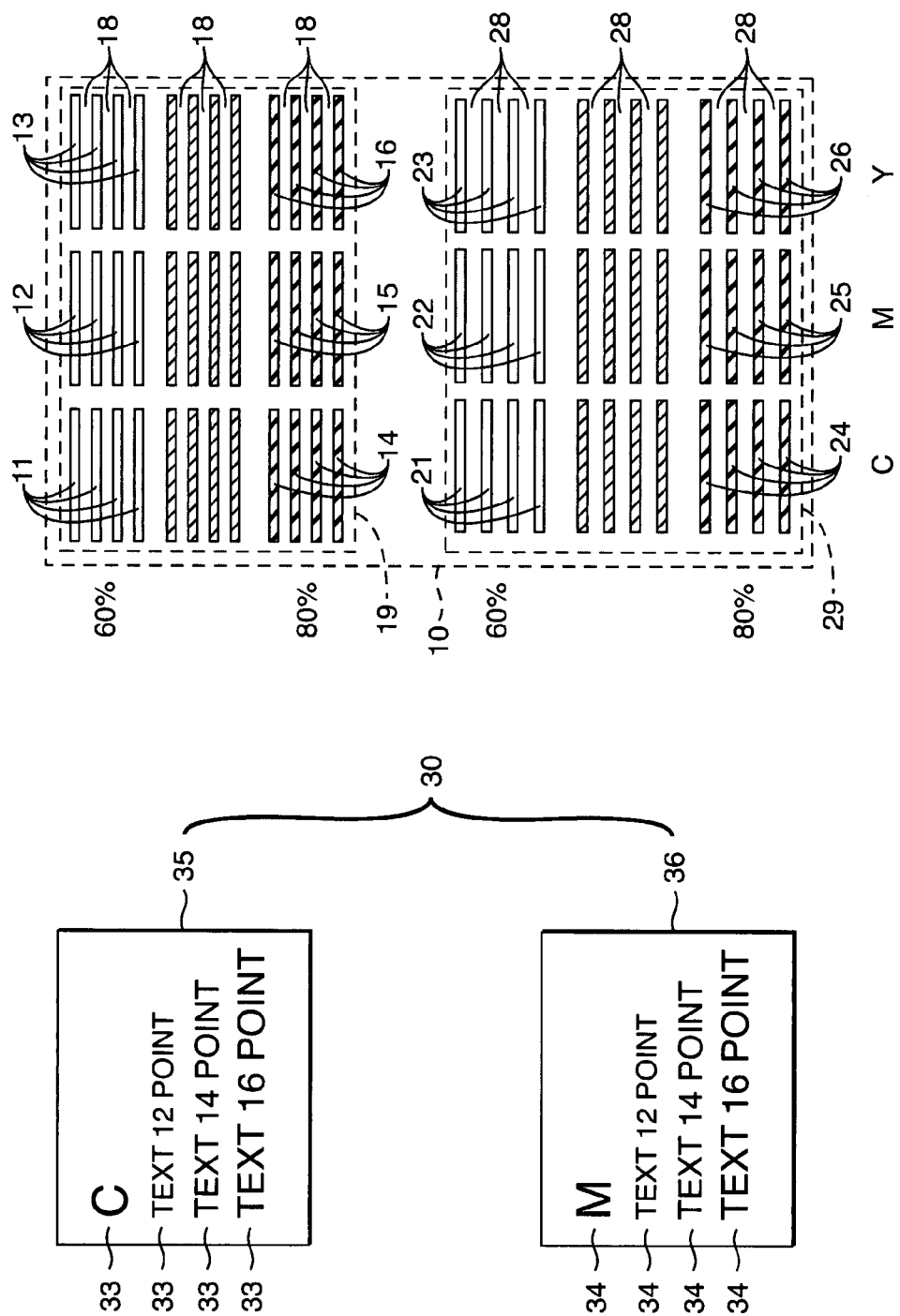
FIG. 1 shows an embodiment of a pattern 10 as used in the invention and an image 30.

FIG. 1 shows a preferred embodiment of a pattern 10 used in the present invention. In a preferred embodiment of the invention, this pattern 10 is used as follows. It is printed by the printing device on the receiving substrate, e.g. a newsprint. The printed pattern 10 is then measured colorimetrically and the measurements are used to determine an artifact characteristic, such as a bleeding characteristic. The measured quantities may include CIE lightness L*, CIE chroma C* or both; preferably CIE chroma C* is measured for yellow and CIE lightness L* for the other colors. The printed pattern 10 includes sets of lines 11-16 and 21-26. To print such a pattern on a receiving substrate, a digital image representing the pattern is sent to the printing device. The digital image consists of pixels; some pixels make up a line of the pattern and other pixels make up white space between the lines. When the pattern 10 is printed on the receiving substrate, the printed image does not correspond exactly to the original digital image representing the pattern because of artifacts such as bleeding. Especially when printing with an ink-jet printer on some low quality paper such as newsprint, the ink can bleed significantly, so that the width (and the length) of the printed lines is larger than the width (and length) of the lines that would exactly correspond to the original digital image. Thus, in the printed pattern 10 of FIG. 1, the amount of white space 18 between the lines 11, when compared to the amount of white space (expressed in pixels for example) in the original digital image, is an indication of the extent of bleeding.

So as to be able to analyze the effect of the ink amount on bleeding, the preferred embodiment of pattern 10 shown in FIG. 1 contains sets of lines printed with different ink amounts, with different colors and with different amounts of white space between the lines of different sets. Pattern 10 includes a first set of lines 11 with a first amount of white space 18 between them and a second set of lines 23 with a second amount of white space 28 between them. The first amount of white space 18 in the printed image corresponds to a first number of pixels between the lines in the original digital image and the second amount of white space 28 corresponds to a second number of pixels between the lines in the original digital image, so that the first number of pixels is different from the second number of pixels. Usually, in the printed image, the first amount of white space 18 is also different from the second amount of white space 28. Pattern 10 contains a first group 19 of sets of lines 11-16 printed with the first number of pixels between the lines and a second group 29 of sets of lines 21-26 printed with the second number of pixels between the lines. In FIG. 1, nine sets of lines of group 15 are shown, of which six are indicated by reference signs (11-16). Lines 11 are printed in cyan, lines 12 in magenta, lines 13 in yellow; a specific amount of ink, e.g. c=60%, is used for these sets of lines. Lines 14 are printed in cyan, lines 15 in magenta, lines 16 in yellow, but using a different amount of ink, e.g. c=80%. Preferably, group 19 includes line patterns printed in the three primary colors (C, M, Y) and the three secondary colors (CM, i.e. blue; CY, i.e. green; MY, i.e. red) for a plurality of ink amounts, e.g. for c=10%, c=20%, and so on until c=100% in steps of 10%, i.e. ten line patterns per color, and thus a total of sixty line patterns, all printed with the first number of pixels between the lines. Group 29 preferably contains the same sixty line patterns as group 19 but now printed with the second number of pixels between the lines. Pattern 10 preferably contains more than two groups, e.g. six groups of line patterns, that all have a different number of pixels between the lines.

Typically, very dark black cannot be achieved on newsprint. In order to obtain a reasonably dark black on newsprint, the amount of black ink is preferably not limited by more than a very small amount, even if further limitation would reduce artifacts. Therefore, it may be more efficient not to determine a bleeding characteristic for black (K) when printing on newsprint.

A way to automatically determine an artifact characteristic, such as a bleeding characteristic, by analyzing printed pattern 10, is as follows.

In a first preliminary step, that was done only once, on a set of a large number of receiving substrates (e.g. different types of newsprint) images such as a negative text image 30 shown in FIG. 1 were printed with different colors and for different printing modes and different ink amounts. Printing negative text image 30 by means of ink-jet means that inside contours 31, 32 ink is deposited on the receiving substrate in the complete areas 35, 36 except at the locations of the text 33, 34. After printing of the images, a visual assessment was made of the bleeding effect in these images; e.g., for the negative text image 30, it was visually determined at what ink amount, e.g. c=z %, the transition occurred from still "open" negative text, i.e. well readable text, to "closed" negative text, i.e. badly readable text due to bleeding, and this for a given font and point size. A pattern such as line pattern 10 was printed on the same set of receiving substrates, and the printed patterns were measured. At the transition ink amount of z %, a change in the measurement values was looked for; such a change may be e.g. a considerable increase or decrease of a measured value. This change was then stored. This was done for a wide range of different printing modes and ink amounts. In this way, a correlation was established between the measurement values of the printed pattern 10 and the visual assessments of the printed images 30.

Figure 2:
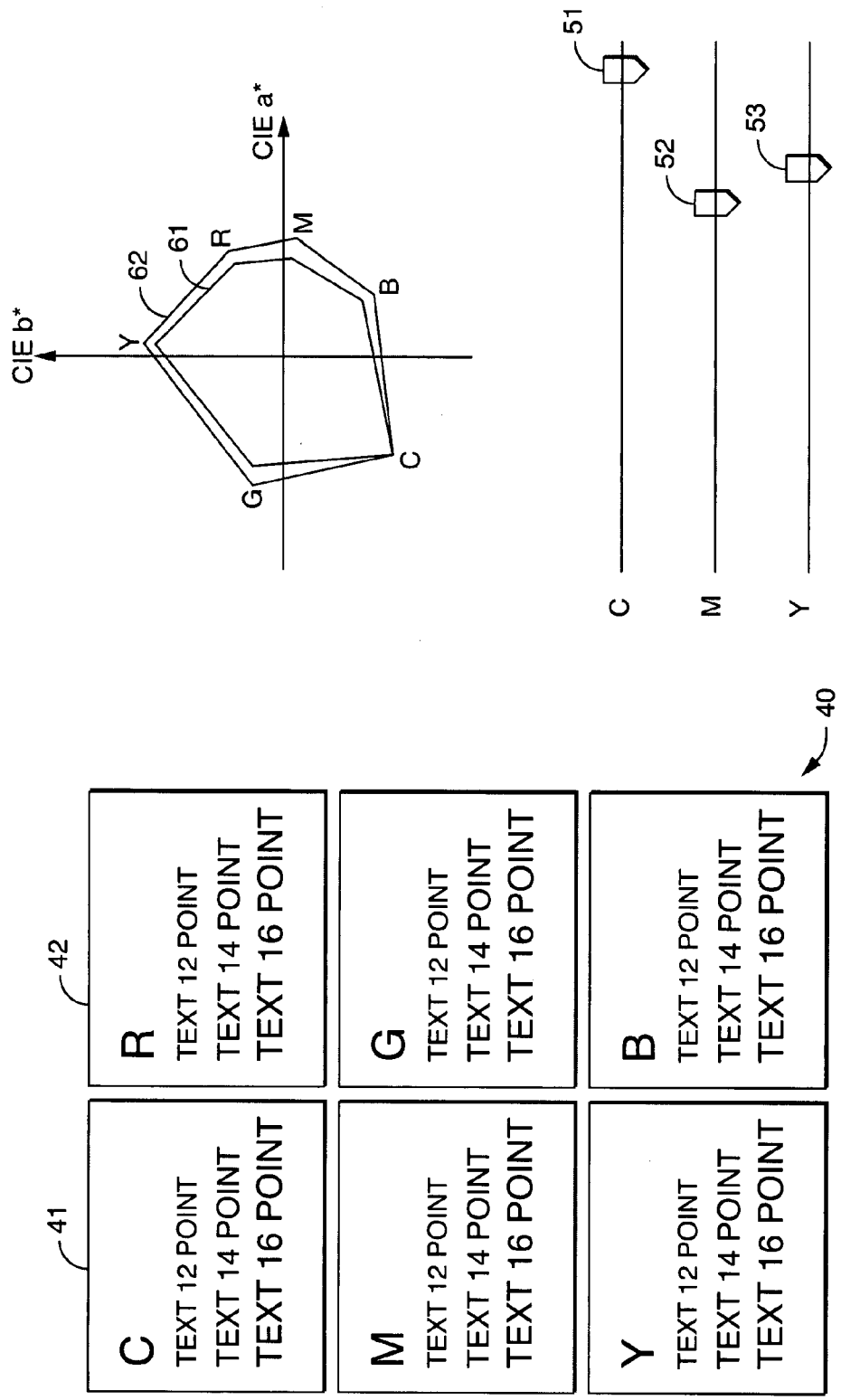
FIG. 2 shows a user interface of a computer program implementing an embodiment of the invention.

The visual assessment may be quantified by a visual acceptance scale. Such a visual acceptance scale may range e.g. from 0 to 5 with the visual acceptance value 0 corresponding to very disturbing artifacts and the value 5 indicating no artifacts at all. Preferably, instead of presenting the visual acceptance value to a user, the effect of the artifact is simulated by showing an image to the user, such as the image 30 with negative text, that is degraded with the corresponding acceptance value. Such a degraded image is shown in FIG. 2 and is discussed further below.

After this first preliminary step, an artifact characteristic, such as a bleeding characteristic, can be determined automatically. Pattern 10 is printed by a user on a specific type of receiving substrate. Measurements are done and the kind of changes in the measurement values that were stored in the preliminary step are looked for. Usually, such a change will occur at a different value of the parameter where the change occurred in the preliminary step, e.g. at an ink amount c=y %, wherein y is different from the previously determined transition ink amount of z % (this means that the transition from still open negative text to closed negative text, indicating bleeding, will occur at c=y % for the specific type of receiving substrate used). In this way, by analyzing data originating from the printed pattern, and by using the correlation as established above between visual assessments and measurement values, it can be predicted, for a given ink amount, if bleeding will be present and to what extent. By applying this method to another artifact characteristic than bleeding, the artifact characteristic can thus be determined automatically from analyzing data originating from the printed pattern.

In the first embodiment of the invention described already above, an ink amount of the printing device is selected and one or more artifact characteristics corresponding to the selected ink amount are automatically determined. Preferably, this is done as follows. A user interface as shown in FIG. 2 is displayed to a user on a computer display. The user interface includes switches 51, 52, 53 for setting the amounts of respectively cyan, magenta and yellow ink. For example, when switch 51 is positioned by the user completely to the right, this means an ink amount of 100% cyan, while the extreme left position of switch 51 corresponds to 0% of cyan ink. The user selects amounts of ink by means of the switches 51, 52 and 53. Then, for these selected ink amounts, the computer program implementing the invention determines the artifact characteristic, e.g. the bleeding characteristic, according to the method discussed above. The computer program then represents the bleeding characteristic in a way that is easy to interpret. The bleeding is represented by showing a degraded image 40 on the computer display; the image 40 is degraded in accordance with the amount of bleeding that corresponds to the ink amounts selected by the user. In FIG. 2, degraded image 40 includes negative text 41, 42 in various sizes and fonts (such as Helvetica and Times) in the primary (C, M, Y) and secondary colors (red, green, blue) colors. The user can interactively change the ink amounts by means of switches 51, 52, 53 and he immediately sees the corresponding bleeding effect on the display, on image 40. Preferably, the gamut corresponding to the ink amounts selected by the user is also determined, as known in the art, and shown. In FIG. 2, the gamut 61 of the printing device is visualized as a projection (in the a*b*—plane of CIELAB space) on top of the gamut 62 of the process that the printing device is to proof. Thus, the user immediately sees the effect of the limitation of ink amounts on both bleeding and gamut. Preferably, the computer program includes a wizard that verifies if the selected ink amounts are valid and that corrects them if necessary. An example of such a correction is a reduction of a selected ink amount that was too high, e.g. a selected ink amount equal to the maximum physically realizable ink amount. Such a too high ink amount is reduced in order to provide sufficient "headroom", so that the ink amount can still be increased later on, to allow compensation of print variations.

This system gives the user the best tools to make a guided choice in the trade-off between gamut and visual artifacts. Once a choice has been made, the associated data may be stored, e.g. by saving them to a file. These data are then used to determine the standard state of the printing device for the concerned printing mode, i.e. for calibration.

In the second embodiment of the invention described already above, the ink limitation to avoid artifacts is not determined interactively but automatically, based on the analysis of data originating from the printed pattern, and by using the correlation as established above between visual assessments and measurement values.

Both in the first and in the second embodiment, the data associated to the determined ink limitation may be stored. These data are then used for calibration. It is preferred that the data include aim values of one or more calibration curves, expressed e.g. as a value of CIE lightness L* or CIE chroma C*.

The same set of data may be used for remotely located printing devices, e.g. for remote proofing.

Usually, each printing mode will have a specific set of data.

The invention is not limited to the embodiments discussed above. The disclosed method can be applied to bleeding and to other artifacts. The disclosed method may be applied to newsprint and to other types of receiving substrate. The printed pattern 10 may be a line pattern, a step wedge, another image. The pattern may comprise sub-images that are printed with different ink combinations. The ink combinations are not limited to the combinations disclosed above. For a CMYK printer, the ink combination may comprise the primary colors (C, M, Y, possibly K), the secondary colors (red, green, blue), overlaps of cyan, magenta and yellow, other color combinations. The effect of ink limitation on the artifact characteristic, on the printer gamut, or on both, may be evaluated with respect to the 1-ink processes only, also with respect to other ink combinations such as the secondary colors, and even overlays of three or more colors may be taken into account.

Those skilled in the art will appreciate that numerous modifications and variations may be made to the embodiments disclosed above without departing from the scope of the present invention.

LIST OF REFERENCE SIGNS

10: pattern
11-16: line
21-26: line
18, 28: white space
19, 29: group
30: printed image
31, 32: contour
33, 34: text
35, 36: area 40: simulated degraded image
41, 42: text
51-53: switch
61, 62: gamut

What is claimed is:

1. A method for predicting an image quality characteristic of a second printing system comprising a printing device and a receiving substrate, the method comprising the steps of:
   (a) printing a first set of test patterns using a first range of values of a printing parameter on at least one first printing system;
   (b) obtaining measurements of a first image quality characteristic on said first set of test patterns for said first range of said printing parameter;
   (c) visually assessing a second image quality characteristic as a function of said printing parameter on said first set of test patterns;
   (d) obtaining a correlation between said first and said second image quality characteristics;
   (e) printing a second set of test patterns using a second range of said printing parameter on the second printing system;
   (f) obtaining measurements of said first image quality characteristic on said second set of test patterns for said second range of the printing parameter;
   (g) selecting one of the first range of values of the printing parameter for said second printing system; and
   (h) predicting a second image quality characteristic based on said first image quality characteristic using said correlation.

2. The method according to claim 1 wherein said printing parameter is an ink amount.

3. The method according to claim 2 further comprising the step of determining a gamut of said second printing system, said gamut corresponding to said selected ink amount.

4. The method according to claim 1 wherein said printing parameter is selected to obtain a given aim value for said second image quality characteristic.

5. The method according to claim 1 wherein said first set of test patterns includes:
   a first line pattern having first lines and a first amount of white space between said first lines; and
   a second line pattern having second lines and a second amount of white space between said second lines; and
   wherein said first amount of white space is different from said second amount of white space.

6. The method according to claim 1 wherein said receiving substrate is suitable for newsprint.

7. A method according to claim 1, wherein said first image quality characteristic is a color value.

8. A method according to claim 1, wherein said second image quality characteristic is ink bleeding.

9. A system for predicting an image quality characteristic of a second printing system, the system comprising:
   data describing a correlation between a first measured image quality characteristic and a second visually assessed image quality characteristic obtained from printing a first set of test patterns on a first printing system using a first range of values of a printing parameter;
   data describing measurements of said first image quality characteristic on a second set of test patterns printed on the second printing system using a second range of printing parameters;
   means for selecting one of the values of the printing parameter;
   means for obtaining the first image quality characteristic from said selected printing parameter using said measurements; and
   means for predicting said second image quality characteristic from said first image quality parameter using said correlation.

10. A system according to claim 9, wherein said printing parameter is an ink amount.

11. A system according to claim 10, further comprising means for determining a gamut corresponding to a selected ink amount.

12. A computer readable medium comprising computer code instructions to be executed on a computer for predicting an image quality characteristic of a second printing system comprising a printing device and a receiving substrate, the computer code comprising:
   instructions for obtaining data describing a correlation between a first measured image quality characteristic and a second visually assessed image quality characteristic obtained from printing a first set of test patterns on a first printing system using a first range of values of a printing parameter;
   instructions for obtaining data describing measurements of said first image quality characteristic on a second set of test patterns printed on the second printing system using a second range of the printing parameter;
   instructions for selecting one of the printing parameter;
   instructions for obtaining a first image quality characteristic from said selected printing parameter using said measurements; and
   instructions for predicting said second image quality characteristic from said first image quality parameter using said correlation.

13. A computer readable medium according to claim 12, wherein said printing parameter is an ink amount.

14. A computer readable medium according to claim 12 further comprising instructions for determining a gamut corresponding a selected ink amount.

* * * * *